United States Patent [19]
Kanai et al.

[11] Patent Number: 5,003,776
[45] Date of Patent: Apr. 2, 1991

[54] HYDRAULIC DRIVE SYSTEM

[75] Inventors: Takashi Kanai, Kashiwa; Masami Ochiai, Chiyoda; Morio Oshina; Mitsuo Sonoda, both of Shimoinayoshi, all of Japan

[73] Assignee: Hitachi Construction Machinery Co., Ltd., Tokyo, Japan

[21] Appl. No.: 378,493

[22] Filed: Jul. 12, 1989

Related U.S. Application Data

[63] Continuation of Ser. No. 127,275, Dec. 1, 1987, abandoned.

[30] Foreign Application Priority Data

Dec. 1, 1986 [JP] Japan .................. 61-284378
Dec. 1, 1986 [JP] Japan .................. 61-284379

[51] Int. Cl.$^5$ .............................. F16H 39/46
[52] U.S. Cl. ........................ 60/434; 60/444; 60/468; 60/494; 91/446
[58] Field of Search ............ 91/445, 446; 417/218; 60/434, 433, 444, 443, 468, 494

[56] References Cited

U.S. PATENT DOCUMENTS

| | | | |
|---|---|---|---|
| 2,932,948 | 4/1960 | Neff et al. ...................... | 60/444 |
| 3,805,676 | 4/1974 | Hamma et al. ................. | 60/434 X |
| 3,881,317 | 5/1975 | Swoager ........................... | 60/444 |
| 3,901,031 | 8/1975 | Knapp et al. ................... | 60/444 X |
| 3,986,358 | 10/1976 | Hoffmann ........................ | 60/468 X |
| 3,999,387 | 12/1976 | Knopf .............................. | 60/451 X |
| 4,080,850 | 3/1978 | Bubula et al. . | |
| 4,118,931 | 10/1978 | Nonnenmacher et al. ...... | 60/444 |
| 4,193,323 | 3/1980 | Bubula et al. . | |
| 4,203,293 | 5/1980 | Bubula et al. . | |
| 4,476,679 | 10/1984 | Sato ................................. | 60/444 X |
| 4,631,005 | 12/1986 | Warren et al. ................. | 417/222 X |

Primary Examiner—Edward K. Look
Attorney, Agent, or Firm—Oblon, Spivak, McClelland, Maier & Neustadt

[57] ABSTRACT

A hydraulic drive system is equipped with an engine, a plurality of hydraulic pumps adapted to be driven by the engine and including a variable displacement hydraulic pump provided with a displacement varying mechanism, a hydraulic motor connected to the variable displacement pump, a hydraulic actuator for actuating the displacement varying mechanism of the variable displacement hydraulic pump, a working fluid feeding means for feeding the hydraulic actuator with a hydraulic fluid of a pressure according to the degree of control of an accelerator lever which is adapted to instruct a target revolution number of the engine, and a low-pressure circuit for allowing the hydraulic fluid to be discharged therethrough from the hydraulic actuator. The system is provided with a maximum pressure limiting means for guiding the hydraulic fluid of the hydraulic fluid feeding means to the low-pressure circuit depending on the degree of control of the accelerator lever, thereby limiting the maximum pressure of the hydraulic fluid and a means for selectively actuating the maximum pressure limiting means.

14 Claims, 11 Drawing Sheets

HYDRAULIC DRIVE SYSTEM

This application is a continuation of application Ser. No. 127,275, filed on Dec. 1, 1987, now abandoned.

BACKGROUND OF THE INVENTION

(1) Field of the Invention

This invention relates to a hydraulic drive system, and particularly to a hydraulic drive system suitable for a construction machine such as a wheel loader or tractor which not only runs the machine but also operates its front attachment.

(2) Description of the Related Art

Most construction machines make use of a hydraulic drive system so that large operating forces can be obtained easily from a small power source and plural working members can be driven by a single power source.

A wheel loader or tractor using such hydraulic drive systems has one hydraulic pump for driving the wheels and another for driving a bucket. A single engine connected to these hydraulic pumps gives power to the wheels and the bucket.

In other words, the hydraulic drive system of a wheel loader or tractor is provided with a single engine, with a variable displacement hydraulic pump for running the vehicle and a hydraulic pump for the bucket, both pumps being driven by the engine; and a hydraulic motor for running the vehicle and a hydraulic cylinder for the bucket, both being driven by hydraulic fluids from their corresponding hydraulic pumps. The variable displacement hydraulic pump for running the vehicle is associated with a hydraulic actuator which drives a mechanism for varying its displacement (as, for example, a swash plate). The hydraulic actuator is provided with a hydraulic fluid feeding means and a low-pressure circuit. The hydraulic fluid feeding means is adapted to feed the hydraulic actuator with a hydraulic fluid of a pressure corresponding to the degree of control (hereinafter to be called "stroke") of an accelerator lever for instructing a target revolution number of the engine, while the low-pressure circuit allows the hydraulic fluid to be discharged therethrough from the hydraulic actuator.

When the hydraulic fluid of the pressure corresponding to the stroke of the accelerator lever is fed to the hydraulic actuator by the hydraulic fluid feeding means, the hydraulic actuator is caused to move to a position corresponding to the pressure of the hydraulic fluid so that the tilting of the swash plate (namely, the displacement) is controlled correspondingly. On the other hand, the revolution number of the engine is controlled in accordance with the target revolution number instructed by the stroke of the accelerator lever, whereby the revolution numbers of the individual hydraulic pumps are also controlled. The hydraulic pump for running the vehicle is therefore controlled in both revolution number and displacement by the accelerator lever, so that the delivery rate is controlled by both revolution number and displacement. As a consequence, the revolutionary speed of the hydraulic motor (namely, the running speed of the wheels) is controlled.

In the hydraulic fluid feeding means, the relation between the stroke of the accelerator lever and the tilting of the swash plate of the hydraulic pump is set in such a way that the tilting of the swash plate reaches the maximum at a predetermined stroke smaller than the maximum stroke. In a control range of the accelerator lever beyond the predetermined stroke, the delivery rate of the hydraulic pump can thus be increased by an increase in revolution number only.

In the above hydraulic drive system, a directional control valve is interposed between the hydraulic fluid feeding means and low-pressure circuit and the hydraulic actuator. The operating direction of the hydraulic actuator is changed over when the directional control valve is operated by an operator. The hydraulic pump for running the vehicle is a double-delivery variable displacement pump. By changing the operating direction of the hydraulic actuator, the discharging direction of the hydraulic pump is switched over, and the direction of revolution of the hydraulic motor (i.e., the running direction of the wheels), is also changed.

A power output shaft of the hydraulic motor is connected to the wheels by way of a mechanical transmission having two positions (a low speed and a high speed) and a differential gear. Owing to this arrangement, either one of the two speed levels can be obtained for the same stroke of the accelerator lever, depending on the shift position of the transmission.

Incidentally, by increasing the speed of a working member of a construction machine such as a wheel loader or a tractor, efficiency is increased. Therefore, the wheel loader or tractor is often operated at a high engine speed in order to increase the delivery rate of its hydraulic pump for the bucket. Where work is performed by a combined operation of a bucket operation and running, the running speed may hence increase too much to perform the work easily in combination with the bucket operation even when the transmission is shifted to the low speed position.

As a solution to the above inconvenience, it may be contemplated that changing the gear ratio of the transmission may reduce the running speed further. When the wheel loader or tractor is merely running without doing any work, the running speed is insufficient, and the gear ratio must be changed over frequently between high speed and low speed. The above approach therefore necessitates the operator to frequently shift the transmission, impairing the running performance. In addition, such an increased gear ratio results in greater drive torques, because of which a need arises that the strength of the axles must be enhanced. However this enhancement of the axle strength leads to an increase in cost, so that the above approach is not suitable.

As another solution, a variable restrictor (which may also be called an "inching valve") may be provided in a main line extending from a directional control valve, which is interposed between the hydraulic fluid feeding means and the low-pressure circuit, and the hydraulic actuator in the hydraulic drive system, to the hydraulic actuator. The variable restrictor is operated by an operating means (for example, a pedal) so that a portion of the hydraulic fluid to be supplied from the hydraulic fluid feeding means to the hydraulic actuator is released to limit the delivery rate of the variable displacement hydraulic pump and hence to reduce the running speed. This method, however, requires the operator to operate the pedal whenever work is done involving a combined operation of running the vehicle and operating the working member, thereby requiring the operator to perform much extra work.

OBJECTS OF THE INVENTION

An object of this invention is to provide a hydraulic drive system which permits a low-speed operation suitable for such a combined operation without resulting in an increase in drive torque to be transmitted by axles.

Another object of this invention is to provide a hydraulic drive system which can facilitate low-speed running performance suitable for such a combined operation without causing extra work for the operator.

SUMMARY OF THE INVENTION

In one aspect of this invention, there is provided a hydraulic drive system equipped with an engine, a plurality of hydraulic pumps adapted to be driven by the engine (including a variable displacement hydraulic pump provided with a displacement varying mechanism), a hydraulic motor connected to the variable displacement pump, a hydraulic actuator for actuating the displacement varying mechanism of the variable displacement hydraulic pump, a working fluid feeding means for feeding the hydraulic actuator with a hydraulic fluid of a pressure corresponding to the degree of control of an accelerator lever which is adapted to instruct a target revolution number of the engine, and a low-pressure circuit for allowing the hydraulic fluid to be discharged therethrough from the hydraulic actuator. The hydraulic drive system comprises a maximum pressure limiting means for guiding the hydraulic fluid of the hydraulic fluid feeding means to the low-pressure circuit depending on the degree of control of the accelerator lever, thereby limiting the maximum pressure of the hydraulic fluid, and a means for selectively actuating the maximum pressure limiting means.

When the accelerator lever is operated, the maximum pressure limiting means controls the maximum pressure of the hydraulic fluid, which is to be fed to the hydraulic actuator, in accordance with the degree of control (i.e., the stroke of the accelerator lever) so that the displacement of the variable displacement hydraulic pump is limited. As a consequence, the delivery rate of the hydraulic pump is controlled only by the revolution number of the engine. The increment of the delivery rate is therefore reduced, and the hydraulic motor is allowed to rotate at a lower speed. It is hence possible to perform low-speed running suitable for a combined operation without increasing the axles' drive torque. Further, once the maximum pressure limiting means is actuated by the actuating means, the maximum pressure is thereafter controlled by the accelerator lever only. It is hence possible to easily perform low-speed running suitable for a combined operation without causing extra work for the operator.

DESCRIPTION OF THE PREFERRED EMBODIMENTS

The First Embodiment

Figure 1:
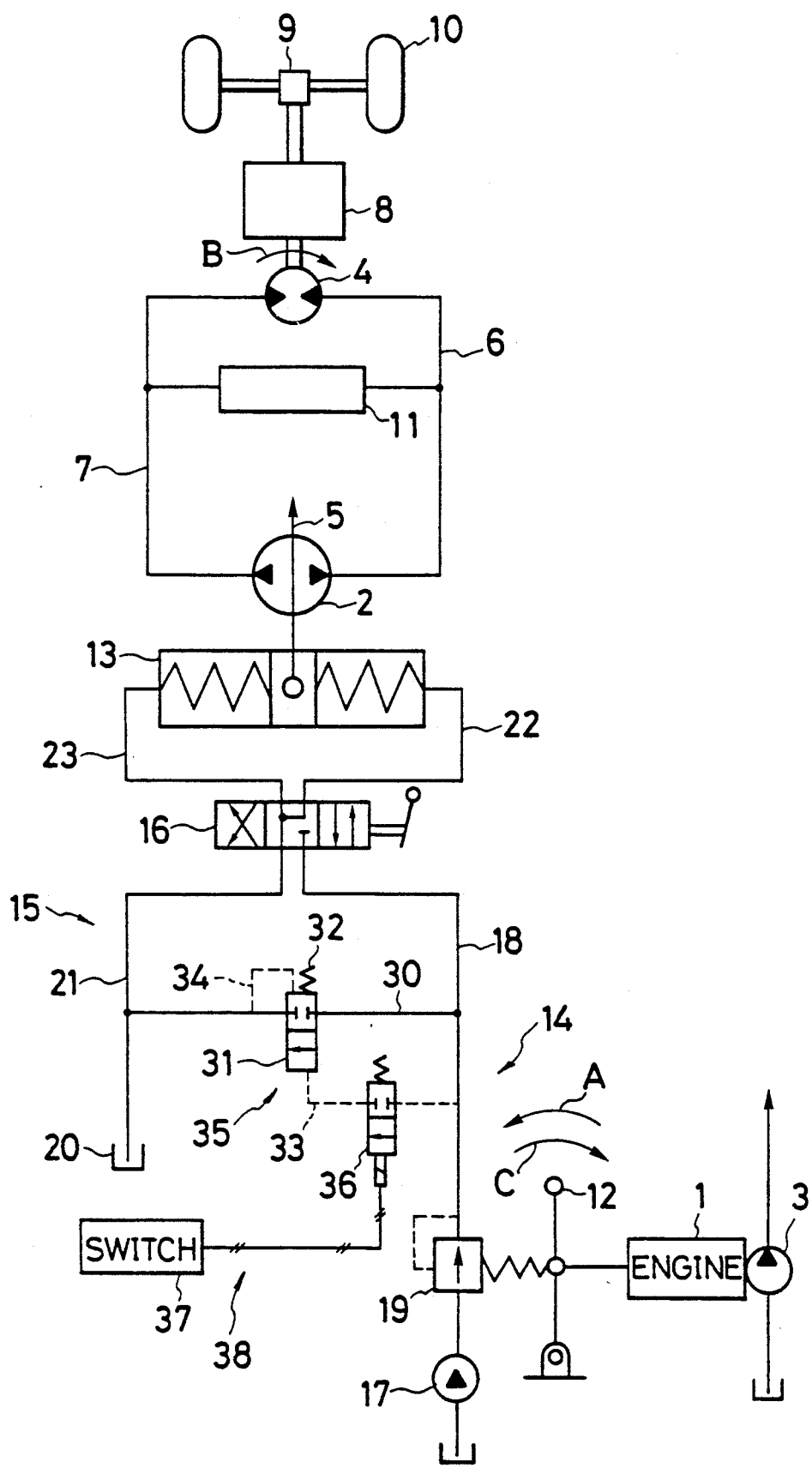
FIG. 1 is a circuit diagram of a hydraulic drive system according to a first embodiment of this invention.

Referring now to FIG. 1, the hydraulic drive system according to the first embodiment of this invention, suited for use in a wheel loader or a tractor, is equipped with a single engine 1, a variable displacement hydraulic pump 2 for running, a hydraulic pump 3 for a bucket (the pumps 2, 3 being driven by the engine 1), a hydraulic motor 4 for running, and a hydraulic cylinder (not shown) for the bucket (the hydraulic motor 4 and the cylinder being driven by hydraulic fluids from their corresponding hydraulic pumps 2, 3). The variable displacement hydraulic pump 2 for running is a double-delivery pump having a mechanism for varying the displacement (for example, of a swash plate 5 and is connected to the hydraulic motor 4 by way of main lines 6, 7. The hydraulic motor 4 is connected at a power output shaft thereof to wheels 10 by way of a mechanical transmission 8 having two shift positions of high and low speeds and a differential gear 9. Connected between the main lines 6, 7 is an auxiliary equipment 11. Although not illustrated in the drawing, the auxiliary equipment 11 may be a crossover release valve, a flushing valve, a charge pump, etc. The revolution number of the engine 1 is controlled by an accelerator lever 12. The accelerator lever 12 sets a target revolution number of the engine 1, which number corresponds to the stroke of the accelerator lever 12.

The swash plate 5 of the variable displacement hydraulic pump 2 is associated with a hydraulic actuator 13, which is connected to a hydraulic fluid feeding means 14 for feeding the hydraulic actuator 13 with a hydraulic fluid of a pressure corresponding to the stroke of the accelerator lever 12 and also to a low-pressure circuit 15 through which the hydraulic fluid from the hydraulic actuator 13 is discharged. Between the system composed of the hydraulic fluid feeding means 14 and the low-pressure circuit 15 and the system composed of the hydraulic actuator 13, there is interposed a directional control valve 16 which serves to change over the operating direction of the hydraulic actuator 13.

The hydraulic fluid feeding means 14 includes a hydraulic pump 17, a hydraulic fluid feeding line 18 connecting the hydraulic fluid source 17 to the directional control valve 16, and a pressure regulator 19 interposed in the hydraulic fluid feeding line 18 and operated by the accelerator lever 12. The low-pressure circuit 15 has a return line 21 connecting the directional control valve 16 to a reservoir 20. The directional control valve 16 is connected to the hydraulic actuator 13 by way of lines 22, 23 arranged in a pair.

The pressure of the hydraulic fluid to be fed to the hydraulic actuator 13 is governed by the setting pressure of the pressure regulator 19. This setting pressure is in turn set in accordance with the stroke of the accelerator lever 12. That is, the hydraulic actuator 13 is fed with hydraulic fluid of a pressure corresponding to the stroke of the accelerator lever 12. Here, the relation between the setting pressure of the pressure regulator 19 and the stroke of the accelerator lever 12 is set in such a way that a maximum setting pressure capable of increasing the tilting of the swash plate 5 to the maximum may be obtained at a predetermined stroke $X_1$ (see FIG. 2) smaller than the maximum stroke of the accelerator lever 12 in other words, before the accelerator lever 12 reaches its maximum stroke. The accelerator lever 12 therefore controls both the revolution number of the engine 1 and the displacement of the hydraulic actuator 13 at the same time in an operation zone smaller than the predetermined stroke $X_1$, whereby the revolution number and displacement of the hydraulic pump 2 are controlled simultaneously to control the delivery rate thereof. In an operation zone of the predetermined stroke $X_1$ and greater, the accelerator lever 12 controls only the revolution number of the engine 1, and therefore in that operation zone the accelerator lever 12 controls only the delivery rate of the hydraulic pump 2 by controlling its revolution number.

A bypass circuit 30 extends between the hydraulic fluid feeding line 18 and the return line 21. Interposed in the bypass circuit 30 is a pilot-operated pressure control valve (for example, a sequence valve 31) which can guide the hydraulic fluid from the hydraulic fluid feeding circuit 18 to the return line 21. The sequence valve 31 is equipped with a spring 32 which serves to set the cracking pressure. Pilot lines 33, 34 are connected respectively to opposing pilot compartments of the sequence valve 31. The pilot lines 33, 34 constitute a means for controlling the operation of the sequence valve 31 on the basis of the pressure of the hydraulic fluid in the hydraulic fluid feeding line 18, which pressure is a quantity of state related to the stroke of the accelerator lever 12. The pilot line 33 extends between the hydraulic fluid feeding line 18 and the corresponding pilot compartment of the sequence valve 31, which pilot compartment is distal from the spring 32, so that the pilot line 33 guides the pressure of the hydraulic fluid in the hydraulic fluid feeding line 18 to the pilot compartment distal from the spring 32. On the other hand, the pilot line 34 extends between the return line 21 and the pilot compartment proximal to the spring 32 in order to guide the pressure of the hydraulic fluid in the return line 21 to the pilot compartment proximal to the spring 32. Accordingly, the differential pressure between the hydraulic fluid in the hydraulic fluid feeding line 18 and that of the hydraulic fluid in the return line 21 is applied to the sequence valve 31 in a direction opposite to the repulsive force of the spring 32 so as to control the operation of the sequence valve 31.

The pressure of the hydraulic fluid in the return line 21 may be considered to be equal to the substantially constant pressure of the hydraulic fluid in the reservoir 20 when the bypass circuit 30 is connected to the return line 21 at a point close to the reservoir 20. Hence, in that situation it is possible to provide the pilot line 33 alone. This is, only the pressure of the hydraulic fluid in the hydraulic fluid feeding line 18 need be applied in a direction opposite to the repulsive force of the spring 32 so as to control the operation of the sequence valve 31, and the pilot line 34 may be omitted.

By the sequence valve 31 equipped with the spring 32 and also by the pilot lines 33, 34, a maximum pressure limiting means 35 is provided which, as will be described below, guides the hydraulic fluid in the hydraulic fluid feeding means 14 to the low-pressure circuit 15 on the basis of the stroke of the accelerator lever 12 so as to limit the maximum pressure of the hydraulic fluid in the hydraulic fluid feeding means 14.

A solenoid-operated on-off valve 36 is interposed in the pilot line 33. A switch 37 operated by an operator is connected to an operated portion of the on-off valve 36, so that the on-off valve 36 is operated by a signal outputted from the switch 37. The on-off valve 36 and the switch 37 constitute a means 38 for selectively actuating the maximum pressure limiting means 35.

The operation of the first embodiment constructed as described above will next be described.

A description will first be made of the operation under a situation under which the switch 37 has not been turned on, the on-off valve 36 assumes a closed position, and the maximum pressure limiting means 35 has not been actuated.

When the accelerator lever 12 is turned in a direction indicated by an arrow A in a situation where the directional control valve 16 has been switched over to the left-hand position as viewed in FIG. 1, the pressure regulator 19 is actuated, and the pressure of the hydraulic fluid in the hydraulic fluid feeding line 18 increases corresponding to the stroke of the accelerator lever 12 as described above. The hydraulic fluid of the above pressure is fed to the left-hand compartment of the hydraulic actuator 13 via the directional control valve 16, while the hydraulic fluid in the right-hand compartment is released into the reservoir 20 by way of the directional control valve 16 and the return line 21. The swash plate 5 is hence tilted, and the hydraulic pump 2 draws the hydraulic fluid from the main line 6. The hydraulic fluid is then discharged into the main line 7, and the hydraulic motor 4 is caused to rotate in a direction indicated by an arrow B. As a result, the wheels 10 are rotated and driven by the power output shaft of the hydraulic motor 4 via the mechanical transmission 8 and the differential gear 9. At the same time, the hydraulic pump 3 is also driven by the engine 1 so that the hydraulic fluid is supplied to the unillustrated hydraulic cylinder for the unillustrated bucket. Intended work can hence be performed by the combined operation of the running and the bucket operation.

When the accelerator lever 12 is turned further in the direction of the arrow A from the above position, the pressure of the hydraulic fluid in the hydraulic fluid feeding line 18 increases further, and the tilting of the swash plate 5 thus becomes greater. At the same time, the revolution number of the engine 1 increases, making the revolution number of the hydraulic pump 2 greater. The delivery rate of the hydraulic pump 2 therefore increases due to the increased tilting, namely, the increased displacement and the increased revolution number. As a result, the revolutionary speed of the hydraulic motor 4 is faster, also increasing the revolutionary speed of the wheels 10 (that is, the running speed). The delivery rate of the hydraulic pump 3 is also increased by the increase in the revolution number of the engine 1, thereby increasing the working speed of the bucket also.

When the accelerator lever 12 is turned further in the direction of the arrow A and its stroke exceeds the predetermined value $X_l$, the setting pressure of the pressure regulator 19 reaches the maximum, and the pressure of the hydraulic fluid in the hydraulic fluid feeding line 18 also reaches the maximum. As a consequence, the displacement of the hydraulic pump 2 also becomes the maximum, and the delivery rate of the hydraulic pump 2 increases further only when the revolution number of the hydraulic pump 2 increases.

When the accelerator lever 12 is turned back in the direction indicated by an arrow C from the above position, an operation takes place in a manner opposite to the above-described operation. The delivery rate of the hydraulic pump 2 decreases, and the revolution number of the hydraulic motor 4 drops, so that the wheels 10 are slowed down. Further, the delivery rate of the hydraulic pump 3 also decreases, making the working speed of the unillustrated bucket slower.

When the directional control valve 16 is changed over in a direction opposite to the direction described above (namely, to a right-hand position as viewed in the drawing), the swash plate 5 is tilted to the opposite side upon operation of the accelerator lever 12. The hydraulic pump 2 therefore delivers the hydraulic fluid to the side of the main line 7, and the hydraulic motor 4 is caused to rotate in a direction opposite to the direction indicated by the arrow B so as to reverse the wheels 10. Here again, the control of the hydraulic pump 2 (and, hence, the control of the hydraulic motor 4) is effected by operating the accelerator lever 12.

Figure 2:
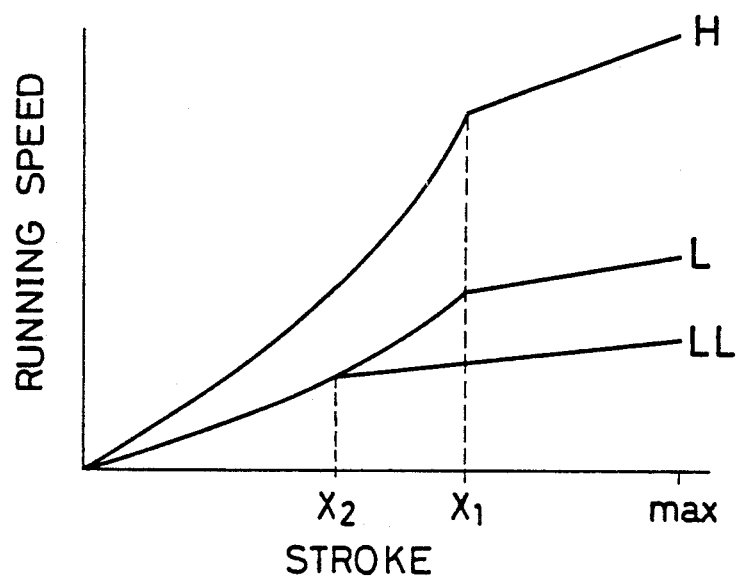
FIG. 2 is a diagrammatic representation illustrating the operation of the hydraulic drive system of FIG. 1, namely, showing the relation between the stroke of an accelerator lever and running speed.

The relation between the stroke of the above-mentioned operation of the accelerator lever 12 and the running speed instructed by the stroke is shown in FIG. 2, in which the letter H indicates a situation where the mechanical transmission 8 has been shifted to the high-speed position, while the letter L designates a situation where the mechanical transmission 8 has been shifted to the low-speed position. In each of the situations, the running speed increases following a quadratic curve up to the predetermined value $X_1$ as the tilting of the accelerator lever 12 and the revolution number of the engine increase. When the stroke becomes greater than $X_1$ after the tilting of the swash plate 5 has reached the maximum at $X_1$, the tilting of the swash plate 5 remains at the maximum value, the running speed becomes a function of the revolution number of the engine 1 alone, and the running speed increases linearly in proportion to the revolution number of the engine 1. High speeds are obtained generally when the mechanical transmission 8 is shifted to the high-speed position H, whereas low speeds are obtained generally when the mechanical transmission 8 is shifted to the low-speed position L.

A description will next be made of a situation where the actuating means 38 has been operated to actuate the maximum pressure limiting means 35.

The operator turns on the switch 37, and a signal outputted from the switch 37 is fed to the on-off valve 36 so as to change over the on-off valve 36 to the closed position. Accordingly, the pilot line 33 is opened. At this time, it is necessary to shift the mechanical transmission 8 to the low-speed position L.

Let's now assume that the directional control valve 16 is switched over to either one of the left-hand and right-hand positions, and the accelerator lever 12 is turned in the direction indicated by the arrow A. Then, the pressure of the hydraulic fluid in the hydraulic fluid feeding line 18 increases in accordance with the stroke of the accelerator lever 12 as described above. This pressure is guided via the pilot line 33 to the pilot compartment of the sequence valve 31, which compartment is distal from the spring 32, and the differential pressure between the pressure of the hydraulic fluid in the pilot compartment and that of the hydraulic fluid in the return line 21 increases as the pressure of the hydraulic fluid in the hydraulic fluid feeding line 18 increases. As soon as the differential pressure reaches the cracking pressure set by the spring 32, the sequence valve 31 is switched over to the open position, whereby the hydraulic fluid feeding line 18 is communicated to the return line 21 via the bypass circuit 30. The pressure increase of the hydraulic fluid in the hydraulic fluid feeding line 18 is therefore inhibited to limit the maximum pressure of the hydraulic fluid in the hydraulic fluid feeding line 18. Owing to the limitation of the maximum pressure, the tilting of the swash plate 5 is limited, and the delivery rate of the hydraulic pump 2 can hence be increased only when the revolution number of the engine 1 is increased.

The maximum pressure limited by the sequence valve 31 is dependent on the cracking pressure of the spring 32. In the illustrated embodiment, the cracking pressure is set in such a way that the maximum pressure is limited as soon as the accelerator lever 12 has reached a second predetermined stroke $X_2$ smaller than the predetermined stroke $X_1$ described above. As illustrated in FIG. 2, the tilting of the swash plate 5 and the revolution number of the engine 1 increase and the running speed therefore increases along a quadratic curve of characteristics L until the stroke of the accelerator lever 12 reaches $X_2$. After the stroke has reached $X_2$, the tilting of the swash plate 5 is thereafter limited, and the running speed thus becomes a function of engine revolution number only, and the running speed increases along a straight line LL in linear proportion to the revolution number of the engine 1.

It is therefore possible to maintain the running speed at the low speed LL while allowing the revolution number of the engine 1 to increase to the maximum. Work, which is performed by a combined operation of running and a bucket operation, can hence be carried out by running at a low speed and performing the bucket operation at a desired speed.

As is apparent from the foregoing, the maximum pressure of the hydraulic fluid feeding line 18 can be limited by the sequence valve 31 to limit the delivery rate of the hydraulic pump 2 in the first embodiment. A shift position of an extremely low speed can hence be added without modifications to the construction of the mechanical transmission 8.

Once the switch 37 is turned on, the operator is thereafter not required to operate the variable restrictor (inching valve). The operation has been thus simplified.

Even when the setting function of such an extremely low speed is added, the maximum value of drive torques applied to the axles remains equal to the previous maximum value. It is hence unnecessary to enhance the strength of the axles to accommodate such an increase in the drive torque.

Furthermore, the relation between the running speed and the stroke of the accelerator lever 12 can be varied by simply changing the setting value of the cracking pressure of the sequence valve 31. The setting can thus be changed with ease.

The Second Embodiment

As the hydraulic fluid feeding means 14 for feeding the hydraulic actuator 13 with the hydraulic fluid of the pressure corresponding to the stroke of the accelerator lever 12 which instructs the target revolution number of the engine 1, the first embodiment described above employs such a construction in which the setting pressure of the pressure regulator 19 is changed in accordance with the stroke of the accelerator lever 12. It is also possible to employ a construction that makes use of a differential pressure which occurs between the upstream and downstream relative to the restrictor. This construction is illustrated as the second embodiment in FIG. 3, in which elements of structure equivalent to those shown in FIG. 1 are designated by like reference numerals.

Figure 3:
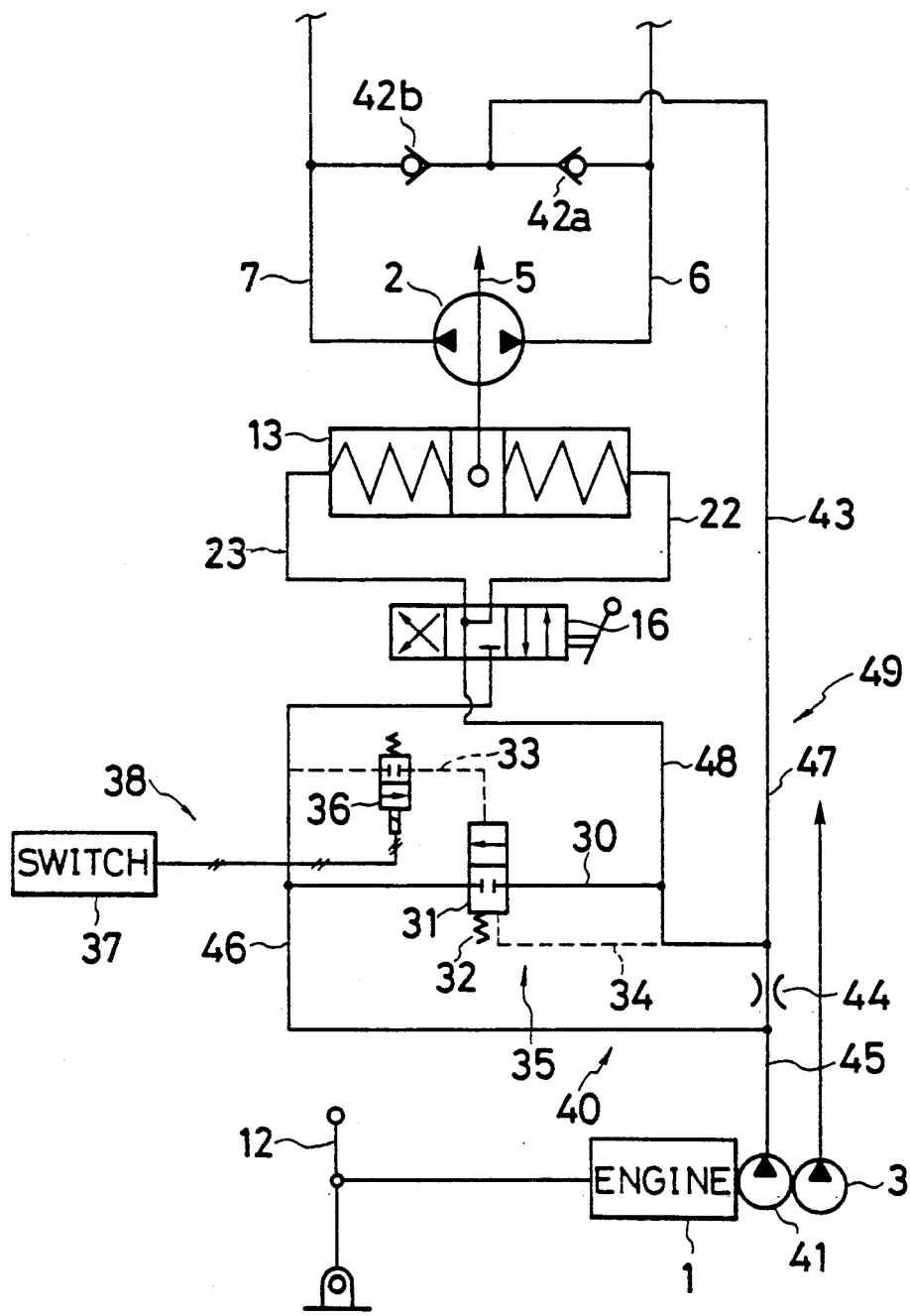
FIG. 3 is a circuit diagram of a hydraulic drive system according to a second embodiment of this invention.

In FIG. 3, the numeral 40 indicates a hydraulic fluid feeding means in the second embodiment. The hydraulic fluid feeding means 40 is constructed by using a hydraulic fluid replenishing circuit composed of a fixed displacement hydraulic pump 41 driven by the engine 1 and a line 43 connecting the hydraulic pump 41 to the main lines 6, 7 via check valves 42a, 42b. That is, a restrictor 44 is provided in the line 43, and a hydraulic fluid feeding line 46 is connected to a line section 45 located upstream of the restrictor 44. On the other hand, a low-pressure line 48 is connected to a line section 47 downstream of the restrictor 44 so as to form a low-pressure circuit 49. The hydraulic fluid feeding line 46 and the low-pressure line 48 are connected to the hydraulic actuator 13 by way of the directional control valve 16 and the lines 22, 23 as in the first embodiment shown in FIG. 1. Furthermore, the hydraulic fluid feeding line 46 and the low-pressure line 48 are also provided with the maximum pressure limiting means 35 and the actuating means 38 as in the first embodiment shown in FIG. 1.

In the second embodiment, the hydraulic pump 41 delivers the hydraulic fluid at a delivery rate corresponding to the revolution number of the engine 1 the target revolution number of which is set based on the stroke of the accelerator lever 12. A differential pressure corresponding to the delivery rate of the hydraulic pump 41 occurs between the line sections 45 and 47 owing to the action of the restrictor 44. The hydraulic fluid feeding means 40 can therefore feed the hydraulic actuator 13 with hydraulic fluid of the pressure corresponding to the stroke of the accelerator lever 1 which instructs the target revolution number of the engine 1. It will be understood clearly that, even when the hydraulic fluid feeding means is constructed in the above-described manner, the maximum pressure limiting means 35 and the actuating means 38 act in practically the same manner as in the first embodiment shown in FIG. 1 and can bring about effects similar to those achieved in the first embodiment.

The Third Embodiment

Figure 4:
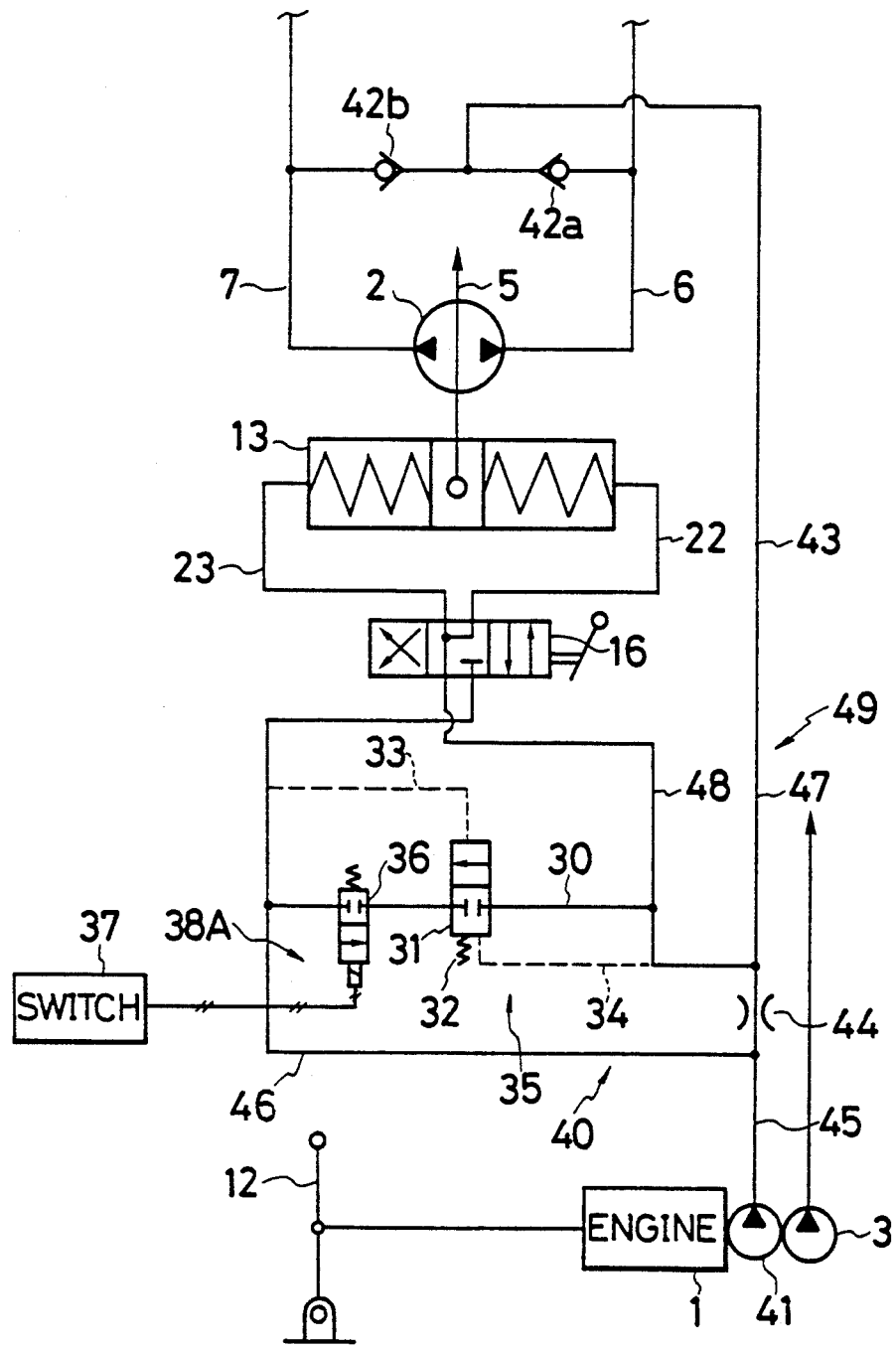
FIG. 4 is a circuit diagram of a hydraulic drive system according to a third embodiment of this invention.

In the second embodiment described above, the actuating means 38 is provided in the pilot line 33 of the sequence valve 31. The actuating means 38 may, however, be provided in the bypass circuit 30. FIG. 4 illustrates such a construction as the third embodiment of this invention. In FIG. 4, elements of structure equivalent to those of the first and second embodiments shown respectively in FIGS. 1 and 3 are designated by like reference numerals.

In FIG. 4, a reference symbol 38A indicates the actuating means of the third embodiment. In the actuating means 38A, the on-off valve 36 is interposed in the bypass circuit 30 at a point between the hydraulic fluid feeding line 46 and the sequence valve 31. So long as the on-off valve 36 remains closed in this construction, the pressure control of the hydraulic fluid feeding line 46 by the sequence valve 31 is not effected even when the sequence valve 31 is operated. As with the first and second embodiments described above, the maximum pressure limiting means 35 can hence be actuated selectively.

Incidentally, the on-off valve 36 may also be interposed in the bypass circuit 30 at a position between the sequence valve 31 and the low-pressure line 48. The hydraulic fluid feeding means 40 may be the hydraulic fluid feeding means 14 of the first embodiment illustrated in FIG. 1.

The Fourth Embodiment

In the third embodiment, the control means for the pressure control valve 31 in the maximum pressure limiting means 35 is constructed hydromechanically. It may also be constructed electrically. Such a construction is illustrated as the fourth embodiment in FIG. 5, in which elements of structure equivalent to those of the first and second embodiments shown respectively in FIGS. 1 and 3 are indicated by like reference numerals.

Figure 5:
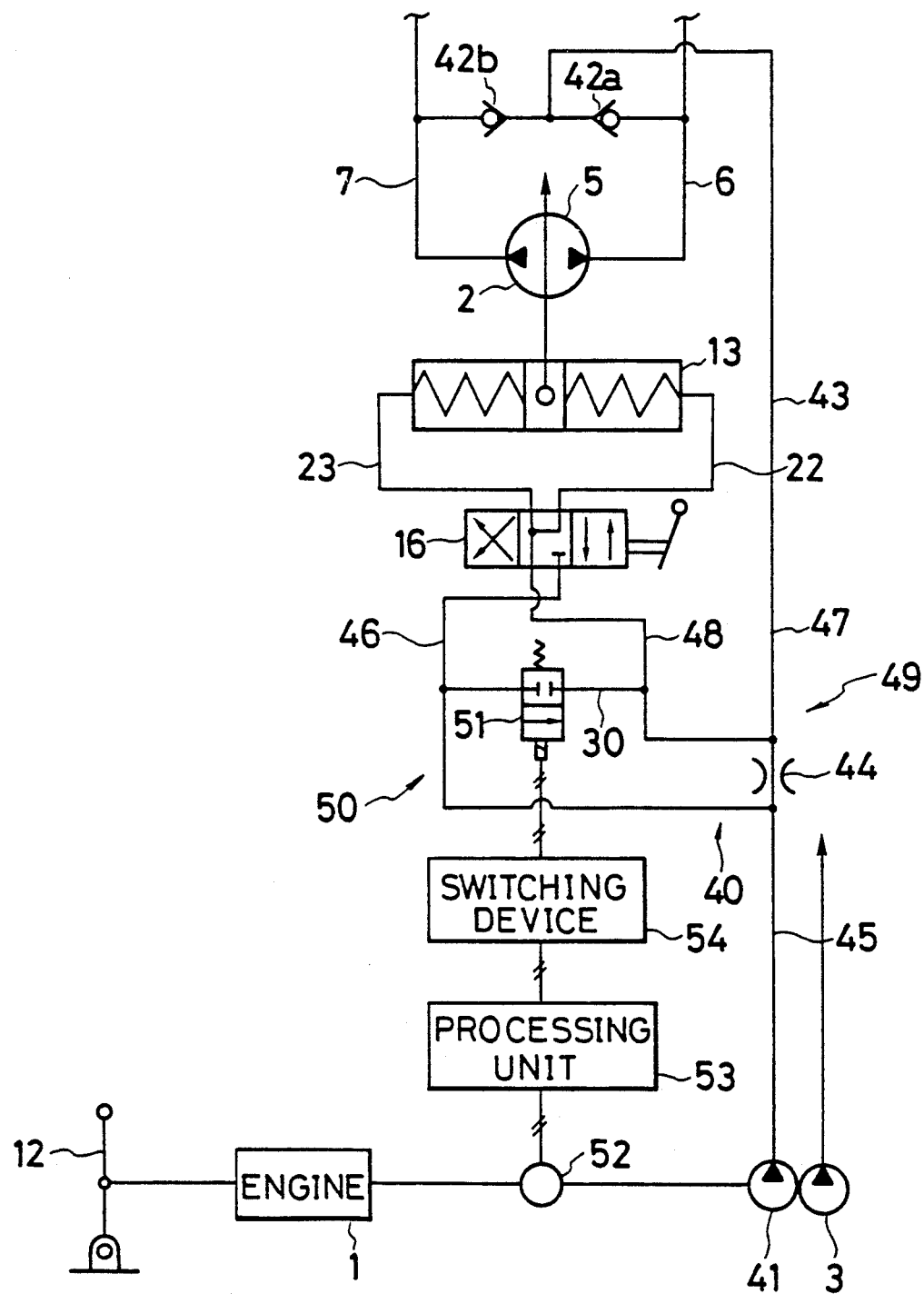
FIG. 5 is a circuit diagram of a hydraulic drive system according to a fourth embodiment of this invention.

In FIG. 5, the numeral 50 designates a maximum pressure limiting means in the fourth embodiment. The maximum pressure limiting means 50 has a solenoid-operated pressure control valve 51 interposed in the bypass circuit 30 connecting the hydraulic fluid feeding line 46 and the low-pressure line 48 to each other, a revolution indicator 52 for detecting the revolution number of the engine 1, and a processing unit 53 connected to the revolution indicator 52 and adapted to output an operating signal to the pressure control valve 51 when the value detected by the revolution indicator 52 reaches a predetermined value. The revolution indicator 52 the and processing unit 53 constitute a means for controlling the operation of the pressure control valve 51 on the basis of the engine revolution number, which is a quantity of state related to the stroke of the accelerator lever 12.

Between the processing unit 53 and the solenoid-operated portion of the pressure control valve 51, a switching device 54 operated by the operator is interposed as a means for selectively actuating the maximum pressure limiting means.

Figure 6:
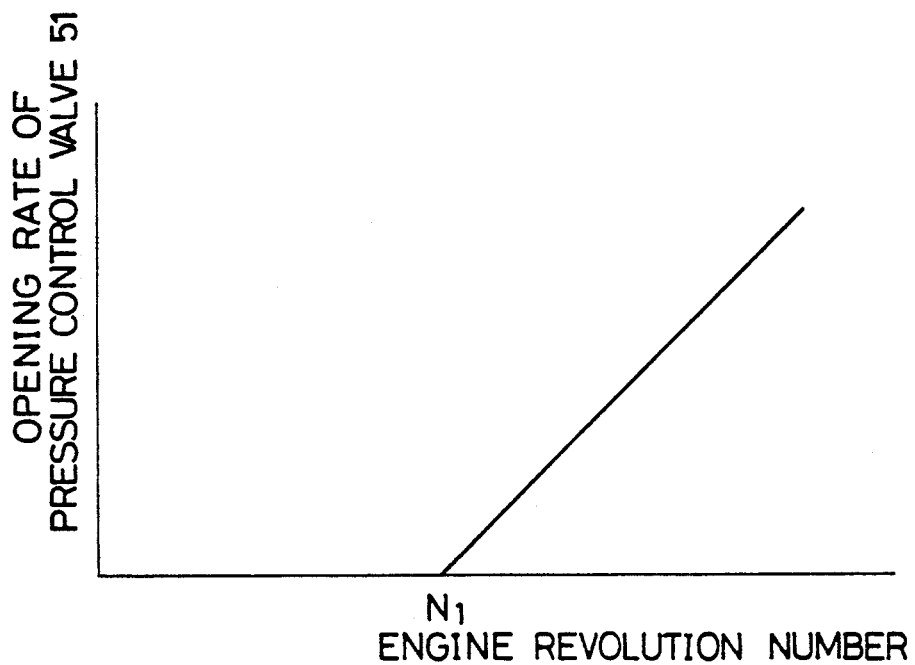
FIG. 6 is a diagrammatic representation showing the functional relation between engine revolution number and valve opening rate, which is set in a processing unit of the hydraulic drive system of FIG. 5.

In the processing unit 53, the functional relation between the detection value of the revolution indicator 52 and the operating signal for the pressure control valve 51 is set as depicted in FIG. 6. That is, when the engine revolution number detected by the revolution indicator 52 has reached a predetermined value $N_1$, the opening rate of the pressure control valve 51 is thereafter increased in accordance with an increase in the engine revolution number, and an operating signal is outputted to retard any pressure increase in the hydraulic fluid feeding line 46.

The fourth embodiment permits the feeding of an operating signal, which has been outputted from the processing unit 53, to the solenoid-operated portion of the pressure control valve 51. When the engine revolution number exceeds $N_1$, the opening rate of the pressure control valve 51 is controlled on the basis of the functional relation preset in the processing unit 53, whereby the hydraulic fluid in the hydraulic fluid feeding line 46 is guided to the low-pressure line 48 so as to prevent any further pressure increase in the hydraulic fluid feeding line 46. As a consequence, like the first to third embodiments described above, the maximum pressure of the hydraulic fluid to be fed to the actuator 13 is limited, the delivery rate of the hydraulic pump 2 is increased only by an increase in the engine revolution number, and work is feasible by a combined operation of running at an extremely low speed and a bucket operation.

The Fifth Embodiment

In the fifth embodiment, the functional relation between the engine revolution number and the valve opening rate (that relationship being adapted to limit the maximum pressure) can be set electrically in the processing unit 53, thereby bringing about the advantages that the selection and modifications of the thus-set values are facilitated.

Figure 7:
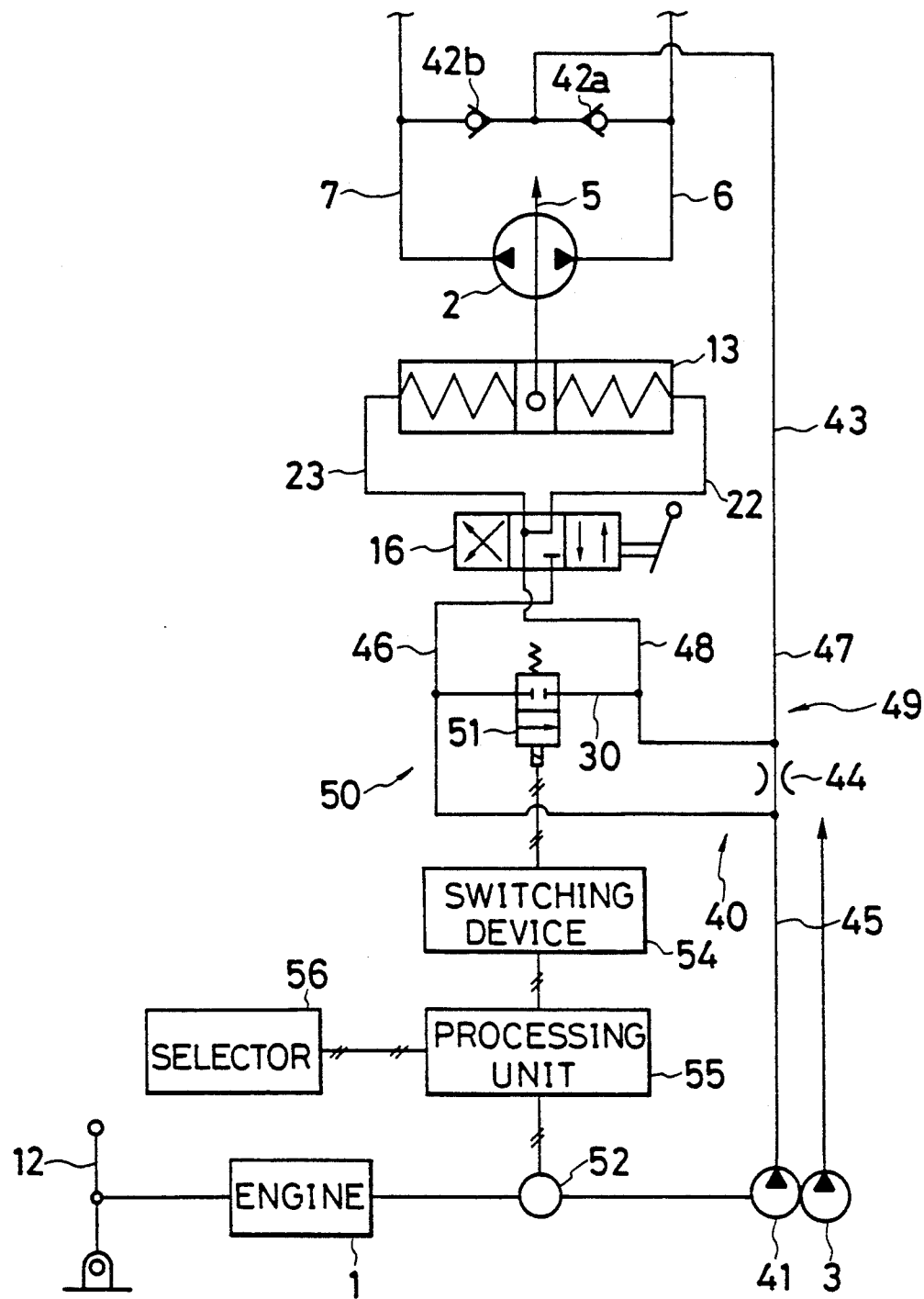
FIG. 7 is a circuit diagram of a hydraulic drive system according to a fifth embodiment of this invention.

In the fifth embodiment, only one functional relation is set between the engine revolution number and valve opening rate. Plural functional relations may, however, be set, and one of the functional relations may be chosen as desired in accordance with the state of each work. Such an embodiment is illustrated as the fifth embodiment in FIG. 7.

Figure 8:
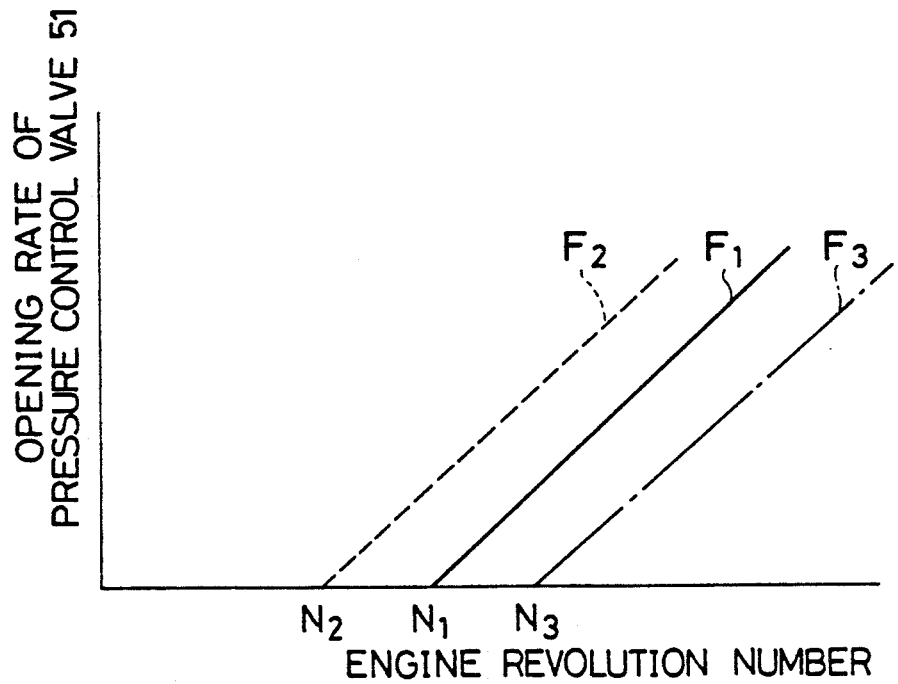
FIG. 8 is a diagrammatic representation illustrating plural functional relations between engine revolution number and valve opening rate, which are set in a processing unit of the hydraulic drive system of FIG. 7.

In a processing unit 55, three functions $F_1$, $F_2$, and $F_3$ are set as depicted in FIG. 8, which is found in the same drawing sheet as FIG. 6. The first function $F_1$ is the same as that shown in FIG. 6. When the engine revolution number reaches another predetermined value $N_2$ smaller than the predetermined value $N_1$, the second function $F_2$ thereafter increases the opening rate of the pressure control valve 51 in accordance with an increase in the engine revolution number and outputs an operating signal to prevent any further pressure increase in the hydraulic fluid feeding line 46. When the engine revolution number reaches a further predetermined value $N_3$ greater than the predetermined value $N_1$, the third function $F_3$ thereafter increases the opening rate of the pressure control valve 51 in accordance with an increase in the engine revolution number and outputs an operating signal to prevent any further pressure increase in the hydraulic fluid feeding line 46. A selector 56 for choosing any one of these three functions is connected to the processing unit 55.

Figure 9:
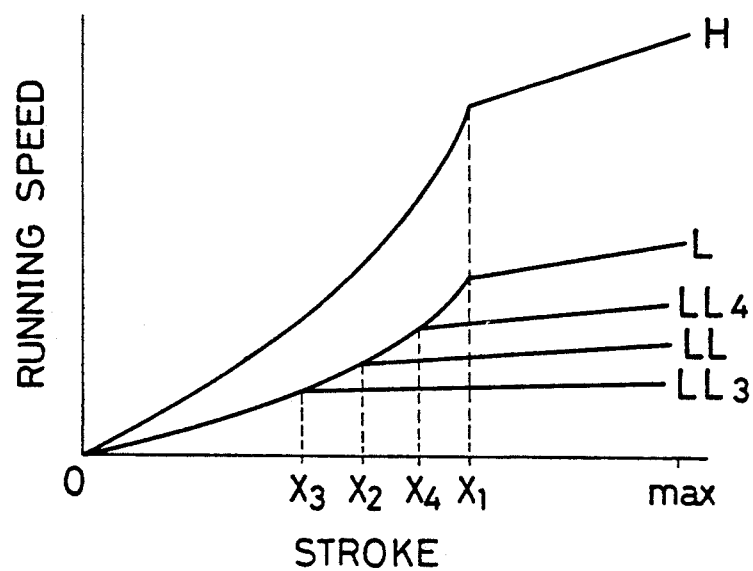
FIG. 9 is a diagrammatic representation illustrating the operation of the hydraulic drive system of FIG. 8, namely, showing the relation between the stroke of an accelerator lever and the running speed.

Let's now assume that the function $F_1$ has been chosen by the selector 56 in the fifth embodiment. When the stroke of the accelerator lever 12 reaches the stroke $X_2$ for obtaining the engine revolution number $N_1$, the delivery rate of the hydraulic pump 2 thereafter increases in accordance with an increase in the engine revolution number only and at the stroke $X_2$. The running speed increases little by little along a straight line LL as shown in FIG. 9, which is found in the same drawing sheet as FIG. 2.

Let's next assume that the function $F_2$ has been chosen by the selector 56. When the stroke of the accelerator lever 12 reaches the stroke $X_3$ for obtaining the engine revolution number $N_2$, the delivery rate of the hydraulic pump 2 thereafter increases in accordance with an increase in the engine revolution number only and at the stroke $X_3$ smaller than the stroke $X_2$. The running speed increases little by little along a straight line $LL_3$ as shown in FIG. 9. Finally, let's also assume that the function $F_3$ has been chosen. When the stroke of the accelerator lever 12 reaches the stroke $X_4$ for obtaining the engine revolution number $N_3$, the delivery rate of the hydraulic pump 2 thereafter increases in accordance with an increase in the engine revolution number only and at the stroke $X_4$ greater than the stroke $X_2$. The running speed increases little by little along a straight line $LL_4$ as shown in FIG. 9. From the foregoing it will be seen that it is hence possible to obtain the speed $LL_3$ still slower than the speed LL or the speed $LL_4$ between the speed LL and the speed L, so that the running speed in work relying upon a combined operation of running and a bucket operation can be adjusted in a still finer manner.

The First Modification of the Sixth Embodiment

In the five embodiments described above, the maximum pressure limiting means 35 or 50 is provided in a hydraulic fluid feeding line 18 or 46 at the point upstream of the directional control valve 16 so that the maximum pressure is limited under the same control characteristics irrespective of the direction of change-over of the directional control valve 16. It is, however, feasible to differentiate the control characteristics of the maximum pressure limiting means in accordance with the direction of change-over of the directional control valve 16. Such an embodiment is depicted as the first modification of the sixth embodiment in FIG. 10, in which elements of structure equivalent to those of the first embodiment shown in FIG. 1 are designated by like reference numerals.

In the first modification of the sixth embodiment, a maximum pressure limiting means 60 is provided between the lines 22, 23 which connect the directional control valve 16 to the hydraulic actuator 13. The maximum pressure limiting means 60 includes a bypass circuit 61 connecting the lines 22, 23 to each other and a pilot-operated pressure control valve 62 interposed in the bypass circuit 61. The pressure control valve 62 is equipped with mutually-opposing springs 63, 64 which set different cracking pressures respectively, and pilot lines 65, 66 are connected respectively to mutually-opposing pilot compartments of the pressure control valve 62. The pilot line 65 is connected to the line 23, while the pilot line 66 is connected to the line 22. Owing to this construction, the differential pressure between the pressures of the lines 22 and 23 is applied in opposition to the repulsive force of either the spring 63 or the spring 64 depending on the position of changeover of the directional control valve 16, whereby the operation of the pressure control valve 62 is controlled. That is the pilot lines 65, 66 constitute a means for controlling the pressure control valve 62 on the basis of the pressure of the hydraulic fluid feeding line 18, which pressure is a quantity of state related to the stroke of the accelerator lever 12.

A solenoid-operated on-off valve 67 is also interposed in the bypass circuit 61. A switch 68, operated by an operator, is connected to an operated portion of the on-off valve 67. The on-off valve 67 is operated by a signal which is outputted from the switch 68. These constitute a means 69 for selectively actuating the maximum pressure limiting means 60.

Where the switch 68 has not been turned on, and the first modification of the on-off valve 67 remains in its closed position in the sixth embodiment constructed as described above, the maximum pressure limiting means 60 does not operate. Like the first embodiment shown in FIG. 1, the running speed is controlled in accordance with the operation of the accelerator lever 12 along a characteristic curve H or $L_1$ depicted in FIG. 11.

When the operator turns on the switch 68 to change over the on-off valve 67 to its open position, the maximum pressure limiting means 60 is actuated. Here, it is necessary to shift the mechanical transmission 8 to the low-speed position L.

When the directional control valve 16 is changed over to the left-hand position, as viewed in the drawing, in the above state, the hydraulic fluid feeding line 18 is connected to the line 23, and the return line 21 is connected to the line 22. When the accelerator lever 12 is turned in the direction of the arrow A, the pressure of the hydraulic fluid in the hydraulic fluid feeding line 18 increases in accordance with the stroke of the accelerator lever 12. This pressure is then guided to the pilot compartment of the pressure control valve 62. This compartment is distal from the spring 63, by way of the pilot line 65, so that the differential pressure between the pressure in the pilot compartment and that in the line 22 increases as the pressure of the hydraulic fluid in the hydraulic fluid feeding line 18 increases. When this differential pressure reaches the cracking pressure set by the spring 63, the pressure control valve 62 is operated to change it over to the closed position. Accordingly, the line 23 is communicated to the line 22 via the bypass circuit 61. As a result, the pressure of the hydraulic fluid to be fed to the hydraulic actuator 13 from the hydraulic fluid feeding line 18 is prevented from increasing so that the maximum pressure of the hydraulic fluid is limited. Owing to this limitation, the tilting of the swash plate 5 is also limited, and the delivery rate of the hydraulic pump 4 is increased only by an increase in the engine revolution number.

When the directional control valve 16 is changed over to the right-hand position as viewed in the drawing, the hydraulic fluid feeding line 18 is connected to the line 22, and the return line 21 is connected to the line 23. As a result, unlike the operation described above, the pressure of the hydraulic fluid to be fed to the hydraulic actuator 13 from the hydraulic fluid feeding line 18 via the line 22 is guided to the pilot compartment of the pressure control valve 62. The pilot compartment is distal from the spring 64, by way of the pilot line 66. When the differential pressure between that in the pilot compartment and that in the line 23 reaches the cracking pressure set by the spring 64, the pressure control valve 62 is changed over to the open position so that the line 22 is communicated to the line 23 via the bypass circuit 61. As a result, the pressure of the hydraulic fluid to be fed to the hydraulic actuator 13 from the hydraulic fluid feeding line is prevented from increasing so that the maximum pressure of the hydraulic fluid is limited. Owing to this limitation, the tilting of the swash plate 5 is also limited, and the delivery rate of the hydraulic pump 4 is increased only by an increase in the engine revolution number.

The maximum pressure limited by the pressure control valve 62 is dependent on the cracking pressures of the springs 63, 64. In the first modification of the sixth embodiment, the cracking pressure of the spring 63 is set in such a way that the maximum pressure is limited when the accelerator lever 12 reaches the predetermined stroke $X_2$ smaller than the stroke $X_1$. On the other hand, the cracking pressure of the spring 64 is set in such a way that the maximum pressure is limited when the accelerator lever 12 reaches the predetermined stroke $X_3$ still smaller than the stroke $X_2$.

Figure 11:
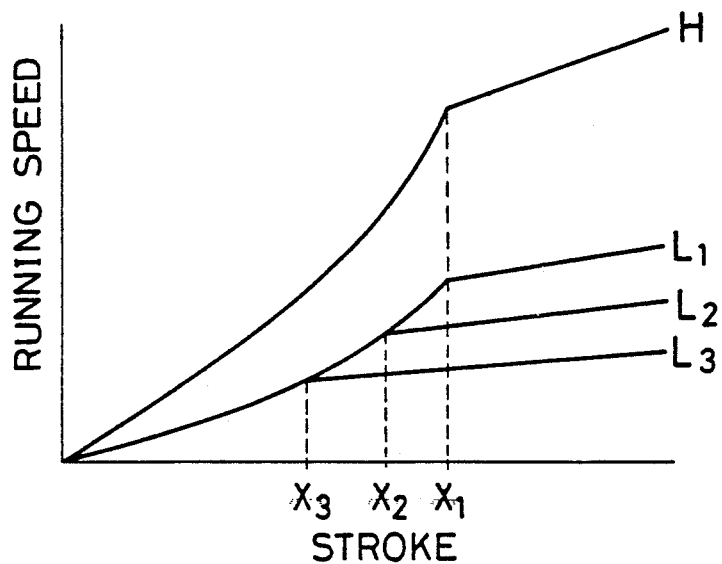
FIG. 11 is a diagrammatic representation illustrating the operation of the hydraulic drive system of FIG. 10, namely, showing the relation between the stroke of an accelerator lever and the running speed.
Figure 14:
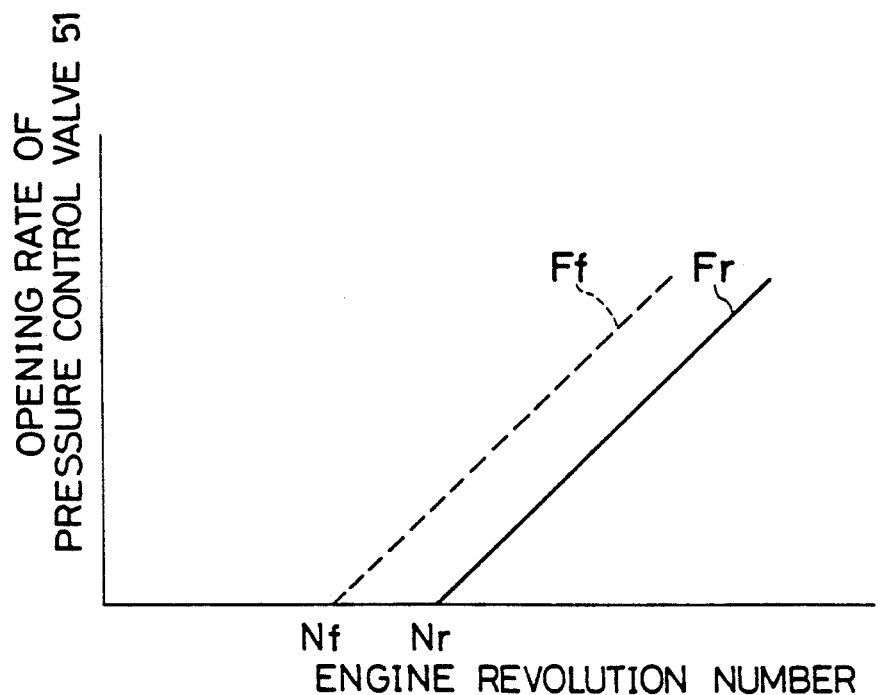
FIG. 14 is a diagrammatic representation illustrating plural functional relations between engine revolution number and valve opening rate, which are set in a processing unit of the hydraulic drive system of FIG. 13.

When the directional control valve 16 is changed over to the left-hand position in the above manner, the running speed increases as indicated by a characteristic curve $L_2$ in FIG. 11—namely, along the same quadratic curve as the characteristic curve $L_1$—until the stroke of the accelerator lever 12 reaches $X_2$, as the tilting of the swash plate 5 and the revolution number of the engine 1 increase. After the stroke has reached $X_2$, the tilting of the swash plate 5 is limited, the running speed varies solely as a function of the revolution number of the engine 1, and the running speed increases little by little in linear proportion to the engine revolution number. When the directional control valve 16 is changed over to the right-hand position, the running speed increases along the same quadratic curve as the characteristic curves $L_1$ and $L_2$ until the stroke of the accelerator lever 12 reaches $X_3$, as the tilting of the swash plate 5 and the revolution number of the engine 1 increase. After the stroke has reached $X_3$, the tilting of the swash plate 5 is limited, the running speed varies solely as a function of the revolution number of the engine 1, and the running speed increases little by little in linear proportion to the engine revolution number. It is, therefore, possible to maintain the running speed either at the low speed position $L_2$ or $L_3$ in accordance with the position of change-over of the directional control valve 16 while still allowing the engine revolution speed to increase to the maximum.

By changing over the directional control valve 16 from the left-hand position to the right-hand position and vice versa, the discharging direction of the hydraulic pump 2 is reversed. In other words, the running direction of the wheels 10 is reversed. If the running direction is set at "forward" when the directional control valve 16 is changed over to the righthand position, the running speed can be set at the low speed $L_3$ much slower than the usual low speed $L_1$. If the running direction is set at "rearward" when the directional control valve 16 is changed over to the left-hand position, the running speed can be set at the low speed $L_2$ faster than the low speed $L_3$ but slower than the usual low speed $L_1$. Accordingly, when work is performed by a combined operation of running and a bucket operation, the running speed can be slowed down sufficiently to reduce shocks to the bucket when running forward, and the running speed can be increased to maintain it at a sufficient level when running rearward, so that the time of the overall working cycle can be shortened.

According to the first modification of the sixth embodiment, two cracking pressures of different levels can be set independently by the two springs 63, 64 in relation to the directions of change-over of the directional control valve 16. It is hence feasible to control the advancing and retreating speeds independently during work, thereby making it possible to set a running speed most suitable for the nature of each work.

The Second Modification of the Sixth Embodiment

Figure 10:
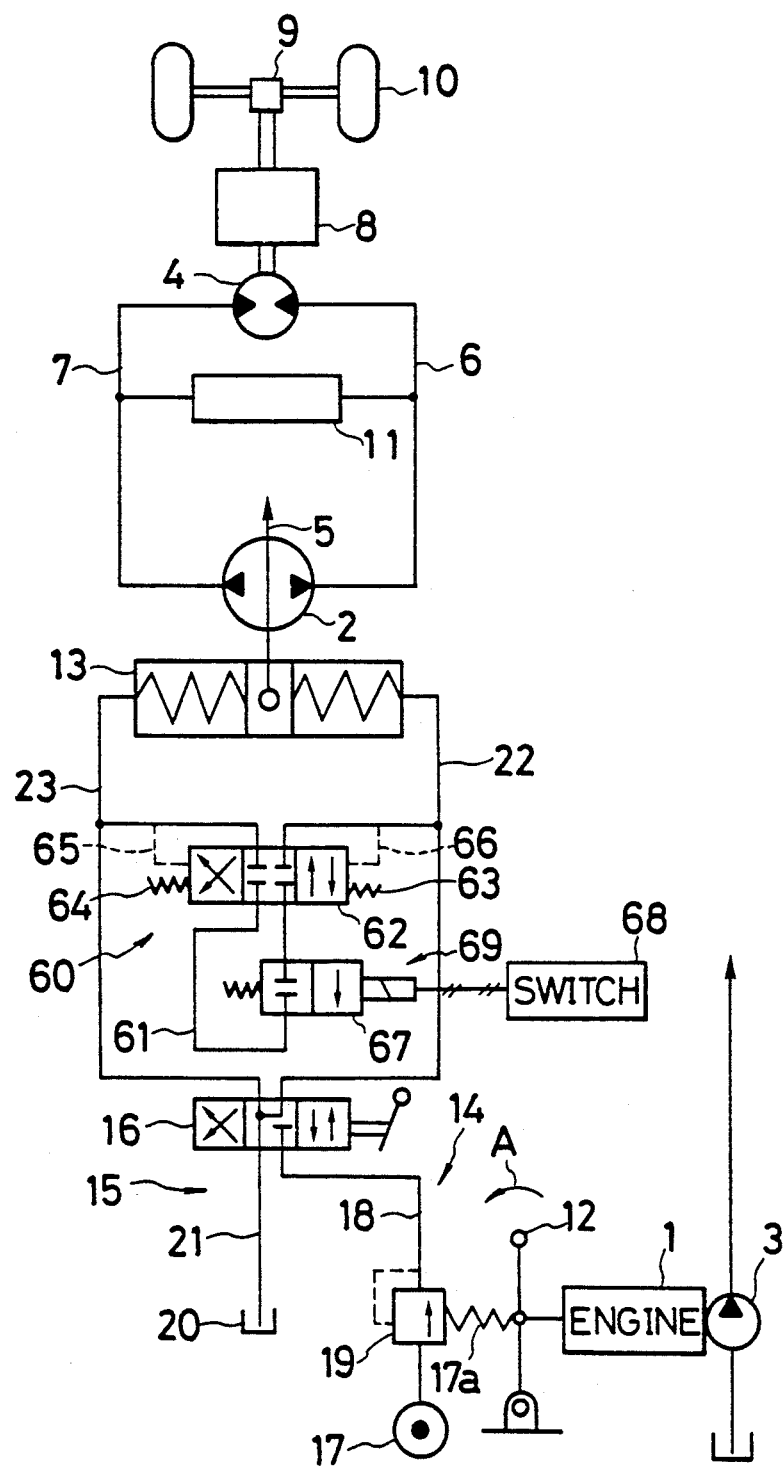
FIG. 10 is a circuit diagram of a hydraulic drive system according to a sixth embodiment of this invention.
Figure 12:
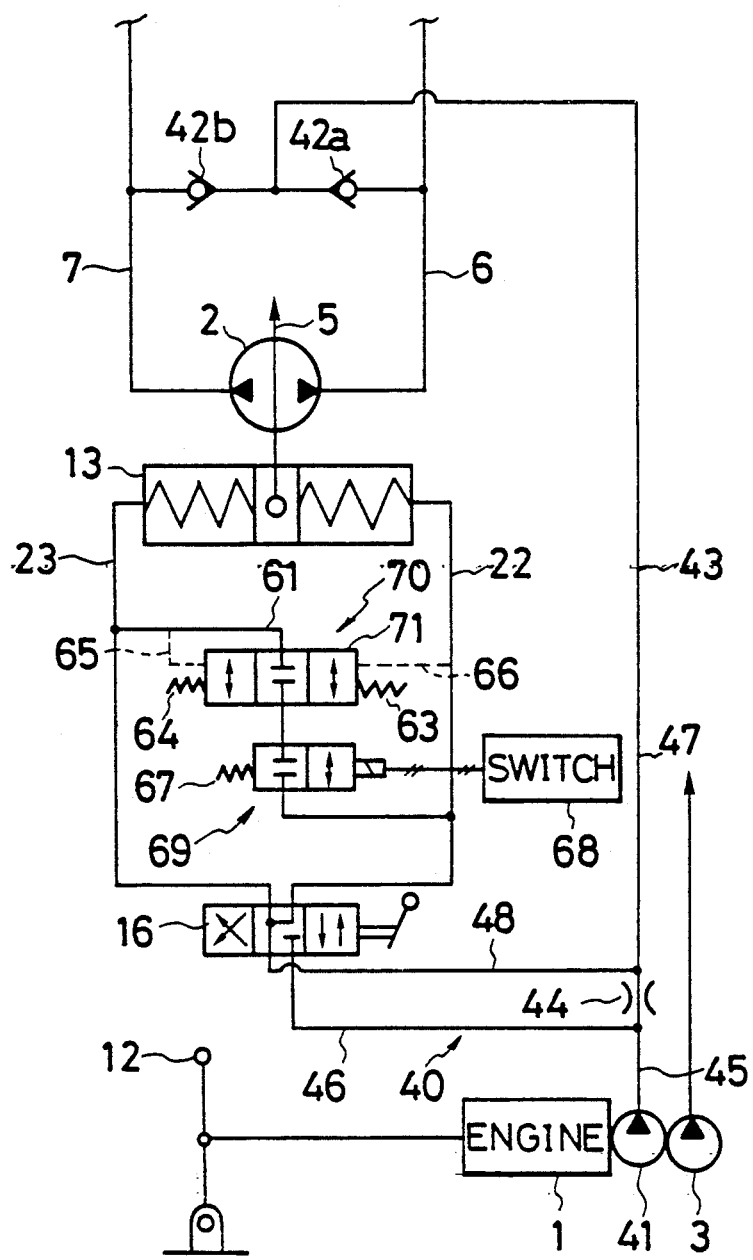
FIG. 12 is a circuit diagram of a hydraulic drive system according to a modification of the sixth embodiment shown in FIG. 10.

In the sixth embodiment, the hydraulic fluid feeding means 14 may be replaced, like the second embodiment shown in FIG. 3, by the hydraulic fluid feeding means 40 making use of the restrictor 44. Such a modified embodiment is illustrated in FIG. 12, in which elements of structure equivalent to those shown in FIGS. 10 and 3 are identified by like reference numerals. In this modified embodiment, a 2-port-connection, 3-position valve is used as a pressure control valve in a maximum pressure limiting means 70 instead of the 4-port-connection, 3-position valve employed in the first modification of the sixth embodiment depicted in FIG. 10. Accordingly the structure has been simplified.

It will be understood clearly that advantages substantially similar to those available from the first modification of the sixth embodiment shown in FIG. 10 can also be obtained from the second modification of the sixth embodiment.

The Seventh Embodiment

In the sixth embodiment illustrated in FIG. 10, the control means for the pressure control valve 62 in the maximum pressure limiting means 60 is constructed hydromechanically. Like the fourth embodiment shown in FIG. 5, it may also be constructed electrically. Such an embodiment is illustrated as the seventh embodiment in FIG. 13, in which elements of structure equivalent to those shown in FIGS. 5 and 10 are identified by like reference numerals.

Figure 13:
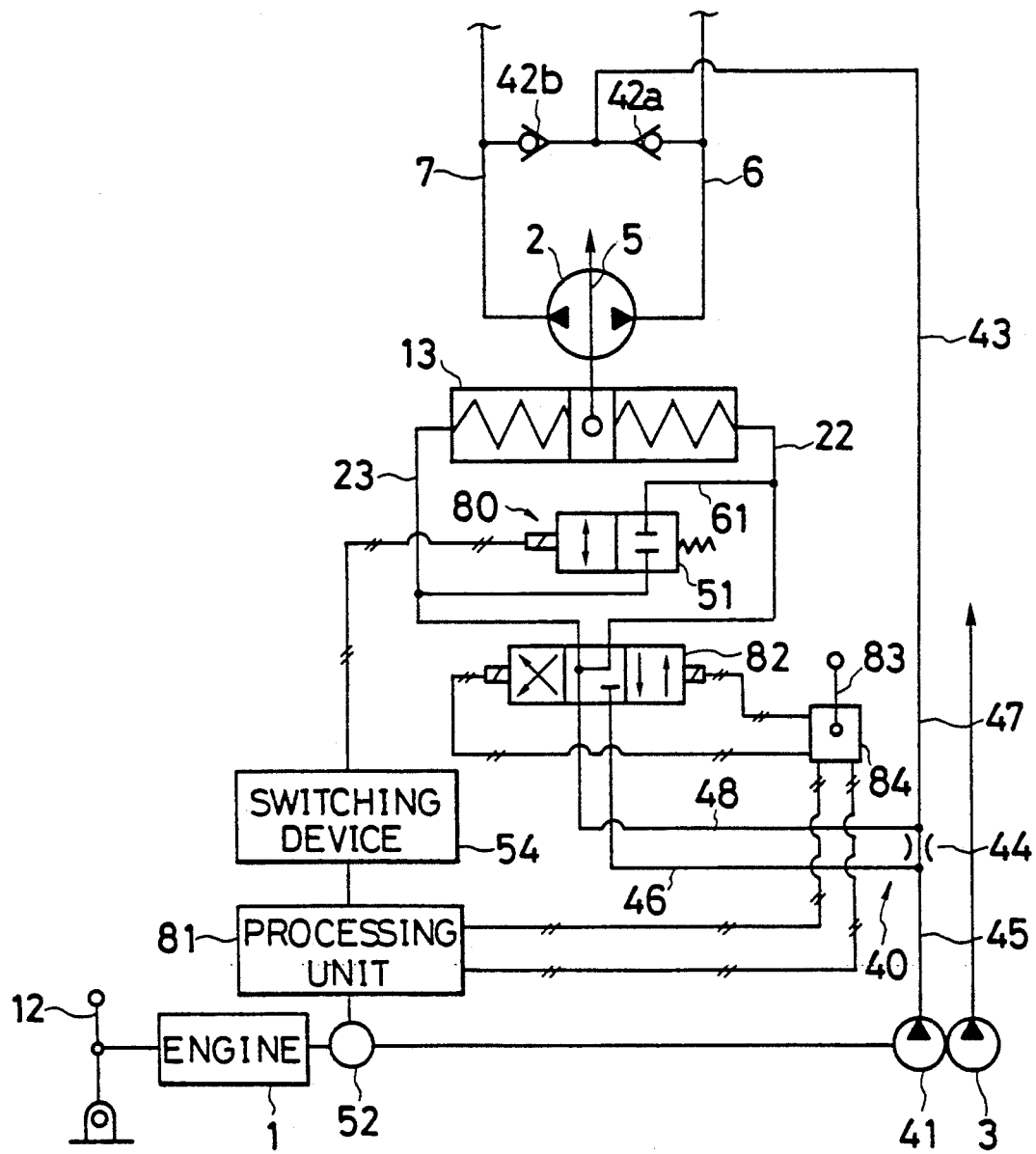
FIG. 13 is a circuit diagram of a hydraulic drive system according to a seventh embodiment of this invention.

In FIG. 13, numeral 80 indicates a maximum pressure limiting means in the seventh embodiment. The maximum pressure limiting means 80 includes the solenoid-operated pressure control valve 51 interposed in the bypass circuit 61 connecting the line 22 and the line 23, the revolution indicator 52 for detecting the revolution number of the engine 1, and a processing unit 81 connected to the revolution indicator 52. A directional control valve 82 for changing over the connection between the hydraulic fluid feeding line 46 and the lines 22 and 23 is constructed as a solenoid-operated directional control valve operated by a signal outputted from an operating device 84 equipped with an operating lever 83. The processing unit 81 is also connected to the operating device 84, so that the change-over direction of the directional control valve 82 is detected in the operating signal.

Two different functions $F_f$, $F_r$ between the engine revolution number and the controlling signal of the pressure control valve 51 are set in the processing unit 81. Either one of the two functions is chosen in accordance with the direction of change-over of the directional control valve 82. When value detected by the revolution indicator 52 reaches a predetermined value $N_f$ or $N_r$, an operating signal is outputted to the pressure control valve 51 in accordance with the function thus chosen. Specifically, the function $F_f$ is chosen when the change-over direction of the directional control valve 82 indicates forward running, and the function $F_r$ is chosen when the change-over direction of the directional control valve 82 indicates rearward running.

In the seventh embodiment, it is also possible to feed an operating signal, which has been outputted from the processing unit 81, to a solenoid-operated portion of the pressure control valve 51 when the switching device 54 interposed between the processing unit 81 and the solenoid-operated portion of the pressure control valve 51 is turned on. Based on the functions $F_f$ and $F_r$ set in the processing unit 81, the advancing and retreating speeds can be controlled independently during work as in the sixth embodiment shown in FIG. 10, so that a running speed most suitable for the nature of each work can be set.

In the seventh embodiment, it is also possible to set the functional relation between the engine revolution number and valve opening rate, the functional relation being adapted to limit the maximum pressure electrically in the processing unit 81. Accordingly, a further advantage brought about is that preset values can be easily chosen or modified.

As has now been understood clearly from the foregoing, once the maximum pressure limiting means is actuated by the actuating means in the present invention, the drive speed for the hydraulic motor can thereafter be controlled by operating the accelerator lever only. It is hence possible to easily perform low-speed running suitable for a combined operation without causing extra work for an operator. Further, increase in the drive torque to be transmitted by axles can be avoided, since the hydraulic motor can be controlled by the maximum pressure limiting means.

We claim:

1. A hydraulic drive system for a vehicle having hydraulically powered wheels and a hydraulically powered work means, said hydraulic drive system comprising:
    (a) an engine;
    (b) a first hydraulic pump for running the wheels, said first hydraulic pump being provided with a displacement varying mechanism;
    (c) a second hydraulic pump for running the work means, said second hydraulic pump being operatively connected to said engine;
    (d) a hydraulic motor operatively connected to said first hydraulic pump;
    (e) a hydraulic actuator for actuating said displacement varying mechanism;
    (f) an accelerator lever which is under the control of the operator of said hydraulic drive system and which is operatively connected to said engine so that the operator can set a target revolution number for said engine;
    (g) a third hydraulic pump for feeding hydraulic fluid to said hydraulic actuator, said third hydraulic pump being operatively connected to said engine;
    (h) a hydraulic fluid feeding means operatively connected between said third hydraulic pump and said hydraulic actuator so that a pressure increased responsive to an increase in the degree of operation of said accelerator lever can be transmitted together with hydraulic fluid to said hydraulic actuator;
    (i) a low-pressure circuit operatively connected to said hydraulic actuator and to said hydraulic fluid feeding means and adapted to allow the hydraulic fluid from said third hydraulic pump to be discharged therethrough;
    (j) a maximum pressure limiting means for bypassing the hydraulic fluid from said hydraulic fluid feeding means to said low-pressure circuit at a pressure value less than the maximum pressure value that said hydraulic fluid feeding means can output to said hydraulic actuator, whereby the maximum value of pressure to be fed to said hydraulic actuator can be limited; and (k) actuating means under the control of the operator of said hydraulic drive system for selectively actuating said maximum pressure limiting means, (l) whereby, when actuation of said maximum pressure limiting means is selected by said actuating means and the revolution number of each of said first and second hydraulic pumps is increased based on an increase in the revolution number of said engine by an operation of said accelerator lever, the delivery rate of said second hydraulic pump increases responsive to the increase in the revolution number of said engine, but the delivery rate of said first hydraulic pump is limited to a value less than the maximum pressure value that would otherwise be outputted responsive to a value set by said maximum pressure limiting means.

2. A hydraulic drive system as recited in claim 1 wherein said maximum pressure limiting means is interposed in a bypass circuit between said hydraulic fluid feeding means and said low-pressure circuit.

3. A hydraulic drive system as recited in claim 2 wherein said maximum pressure limiting means comprises:

(a) a valve means for guiding the hydraulic fluid from said hydraulic fluid feeding means to said low-pressure circuit and (b) a control means for controlling the operation of said valve means on the basis of a quantity of state related to the position of said accelerator lever.

4. A hydraulic drive system as recited in claim 3 wherein:

(a) said valve means comprises a pilot-operated pressure control valve equipped with a spring means for setting a cracking pressure and (b) said control means comprises a pilot line for guiding the pressure of the hydraulic fluid from said hydraulic fluid feeding means against said spring means.

5. A hydraulic drive system as recited in claim 4 wherein said means for selectively actuating said maximum pressure limiting means comprise:

(a) a switch means under the control of the operator of said hydraulic drive system and (b) an on-off valve located in said pilot line and operatively connected to said switch means.

6. A hydraulic drive system as recited in claim 4 wherein said means for selectively actuating said maximum pressure limiting means comprise:

(a) a switch means under the control of the operator of said hydraulic drive system and (b) an on-off valve located in said bypass circuit and operatively connected to said switch means.

7. A hydraulic drive system as recited in claim 3 wherein:

(a) said valve means comprises a solenoid-operated pressure control valve and (b) said control means comprise:

(i) a detection means for detecting a quantity of state related to the position of said accelerator lever and (ii) a process means for outputting a signal to operate said solenoid-operated pressure control valve when the value detected by said detecting means reaches a predetermined value.

8. A hydraulic drive system as recited in claim 7 wherein said actuating means comprises a switching means interposed between said processing means and said solenoid-operated pressure control valve, said switching means being adapted to be actuated by the operator of said hydraulic drive system.

9. A hydraulic drive system as recited in claim 7 wherein:

(a) said processing means contains a plurality of different functions preset between the quantity of state and the signal outputted to operate said solenoid-operated pressure control valve and (b) any desired one of said plurality of functions can be chosen by a selector means operatively connected to said processing means.

10. A hydraulic drive system as recited in claim 1 wherein:

(a) said hydraulic drive system further comprises a direction control valve operatively connected between said hydraulic fluid feeding means and said low-pressure circuit;

(b) said directional control valve is connected to said hydraulic actuator via first and second lines;

(c) said maximum pressure limiting means is interposed in a bypass circuit between said first and second lines;

(d) said maximum pressure limiting means comprises:

(i) a valve means capable of guiding the hydraulic fluid from said hydraulic fluid feeding means to said low-pressure circuit and (ii) a control means for controlling the operation of said valve means on the basis of a quantity of state related to the position of said accelerator lever and the direction of changeover of said directional control valve.

11. A hydraulic drive system as recited in claim 10 wherein:

(a) said valve means comprises a pilot-controlled pressure control valve equipped with first and second spring means for setting different cracking pressures respectively and (b) said control means comprises:

(i) a first pilot line for applying the pressure of the hydraulic fluid that has been fed from said hydraulic fluid feeding means to said first line to said pilot-controlled pressure control valve against said first spring means and (ii) a second pilot line for applying the pressure of the hydraulic fluid that has been fed from said hydraulic fluid feeding means to said second line to said pilot-controlled pressure control valve against said second spring means.

12. A hydraulic drive system as recited in claim 11 wherein said actuating means comprises:

(a) a switch means adapted to be actuated by the operator of said hydraulic drive system and (b) an on-off valve interposed in said bypass circuit and adapted to be operated by an output signal from said switch means.

13. A hydraulic drive system as recited in claim 10 wherein:

(a) said valve means comprises a solenoid-operated pressure control valve and (b) said control means comprise:

(i) a first detection means for detecting a quantity of state related to the position of said accelerator lever;

(ii) a second detection means for detecting the direction of changeover of said directional control valve; and (iii) a processing means that contains first and second different functions preset between the quantity of state detected by said first detection means and an operating signal for solenoid-operated pressure control valve, that choses either the first function or the second function in accordance with the direction of changeover of said directional control valve detected by said second detection means, and that outputs the operating signal to said solenoid-operated pressure control valve.

14. A hydraulic drive system as recited in claim 13 wherein said actuating means comprises a switch means:
    (a) interposed between said processing means and said solenoid-operated pressure control valve and
    (b) adapted to be actuated by the operator of said hydraulic drive system.

* * * * *